(12) United States Patent
Li

(10) Patent No.: US 12,099,861 B2
(45) Date of Patent: Sep. 24, 2024

(54) SWITCHING BETWEEN MASTER AND STANDBY CONTAINER SYSTEMS

(71) Applicant: New H3C Technologies Co., Ltd., Zhejiang (CN)

(72) Inventor: Yong Li, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 994 days.

(21) Appl. No.: 17/043,200

(22) PCT Filed: Jun. 20, 2019

(86) PCT No.: PCT/CN2019/092019
§ 371 (c)(1),
(2) Date: Sep. 29, 2020

(87) PCT Pub. No.: WO2020/001354
PCT Pub. Date: Jan. 2, 2020

(65) Prior Publication Data
US 2021/0311768 A1   Oct. 7, 2021

(30) Foreign Application Priority Data
Jun. 29, 2018  (CN) .......................... 201810697116.3

(51) Int. Cl.
*G06F 9/455* (2018.01)
*G06F 8/65* (2018.01)
(Continued)

(52) U.S. Cl.
CPC ............ *G06F 9/45558* (2013.01); *G06F 8/65* (2013.01); *G06F 11/1484* (2013.01);
(Continued)

(58) Field of Classification Search
None
See application file for complete search history.

(56) References Cited

U.S. PATENT DOCUMENTS 9,916,233 B1 *  3/2018  Qureshi .............. G06F 11/3688
9,929,931 B2 *  3/2018  Breitgand ........... G06F 9/45558
(Continued)

FOREIGN PATENT DOCUMENTS

CN    102662751 A    9/2012
CN    103188099 A    7/2013
(Continued)

OTHER PUBLICATIONS

ISA State Intellectual Property Office of the People's Republic of China, International Search Report Issued in Application No. PCT/CN2019/092019, Aug. 26, 2019, WIPO, 4 pages.
(Continued)

*Primary Examiner* — Hiren P Patel
(74) *Attorney, Agent, or Firm* — GREENBLUM & BERNSTEIN, P.L.C.

(57) ABSTRACT

A method and an apparatus for switching between master and standby container systems are provided. The method may be applied to a first container system deployed in a physical network device and functioning as a master container system, and a shared file is created in the physical network device. The method includes: receiving a system upgrade instruction input by a user; in response to the system upgrade instruction, sending container system data to a second container system functioning as a standby container system corresponding to the master container system in the physical network device; when receiving a data backup completion notification from the second container system, writing a master/standby container system switching notification into the shared file, so that the second container system switches to function as the master container system when detecting that the master/standby container system switching notification in the shared file.

11 Claims, 5 Drawing Sheets

(51) Int. Cl.
*G06F 11/14* (2006.01)
*G06F 11/30* (2006.01)

(52) U.S. Cl.
CPC .... *G06F 11/301* (2013.01); *G06F 2009/4557* (2013.01); *G06F 2009/45575* (2013.01); *G06F 2009/45595* (2013.01)

(56) References Cited

U.S. PATENT DOCUMENTS

| | | | |
|---|---|---|---|
| 10,007,509 | B1* | 6/2018 | Qureshi .................. G06F 8/656 |
| 10,185,638 | B2* | 1/2019 | Duan .................. G06F 11/2028 |
| 10,454,754 | B1* | 10/2019 | Patel .................. H04L 41/0654 |
| 10,521,311 | B1* | 12/2019 | Greenwood ........ G06F 11/1448 |
| 10,671,571 | B2* | 6/2020 | Wells ...................... H04L 67/06 |
| 11,010,259 | B1* | 5/2021 | Geng .................. G06F 11/1469 |
| 11,263,098 | B2* | 3/2022 | Hamel .................. G06F 16/284 |
| 11,516,072 | B2* | 11/2022 | Patel .................. H04L 41/0654 |
| 2008/0144532 | A1* | 6/2008 | Chamarajanagar ..... H04L 69/40 370/255 |
| 2011/0113426 | A1* | 5/2011 | Kung .................... G06F 9/4856 718/1 |
| 2012/0159101 | A1* | 6/2012 | Miyoshi ................ G06F 12/109 711/E12.103 |
| 2013/0136126 | A1* | 5/2013 | Wang .................... H04L 61/103 370/392 |
| 2014/0036660 | A1 | 2/2014 | Hiroto et al. |
| 2014/0245294 | A1* | 8/2014 | Kaul .................. G06F 9/45558 718/1 |
| 2015/0052522 | A1 | 2/2015 | Chanda et al. |
| 2015/0100960 | A1* | 4/2015 | Shigeta ................. G06F 9/5088 718/1 |
| 2016/0224371 | A1* | 8/2016 | Ramanathan ....... G06F 9/45558 |
| 2016/0239437 | A1* | 8/2016 | Le ....................... G06F 11/2069 |
| 2017/0090897 | A1* | 3/2017 | Veereshwara ........... H04L 67/34 |
| 2017/0270007 | A1* | 9/2017 | Huang .................. G06F 9/455 |
| 2018/0121189 | A1* | 5/2018 | Philippov ................. G06F 8/65 |
| 2018/0157508 | A1 | 6/2018 | Chen et al. |
| 2018/0196741 | A1* | 7/2018 | Qureshi .................... G06F 8/60 |
| 2018/0218007 | A1* | 8/2018 | Wells .................. H04L 67/1097 |
| 2018/0241838 | A1* | 8/2018 | Druzhinin ........... H04L 67/1097 |
| 2019/0012110 | A1* | 1/2019 | Okano .................. G06F 3/0659 |
| 2019/0349305 | A1* | 11/2019 | Wang ........................ H04L 9/14 |
| 2019/0377821 | A1* | 12/2019 | Pleshachkov ......... G06F 16/273 |

FOREIGN PATENT DOCUMENTS

| | | |
|---|---|---|
| CN | 103534982 A | 1/2014 |
| CN | 104536842 A | 4/2015 |
| CN | 105159798 A | 12/2015 |
| CN | 105183558 A | 12/2015 |
| CN | 105550576 A | 5/2016 |
| CN | 105630615 A | 6/2016 |
| CN | 106789928 A | 5/2017 |
| CN | 108132829 A | 6/2018 |
| CN | 108139925 A | 6/2018 |
| CN | 108880898 A | 11/2018 |
| JP | H10293697 A | 11/1998 |
| JP | 2015032301 A | 2/2015 |
| JP | 2017027496 A | 2/2017 |
| WO | 2017053810 A1 | 3/2017 |
| WO | 2017179537 A1 | 10/2017 |

OTHER PUBLICATIONS

State Intellectual Property Office of the People's Republic of China, Office Action and Search Report Issued in Application No. 2018106971163, Dec. 13, 2019, 12 pages, (Submitted with Machine Translation).
State Intellectual Property Office of the People's Republic of China, Office Action and Search Report Issued in Application No. 2018106971163, Apr. 1, 2020, 8 pages, (Submitted with Machine Translation).
Japanese Patent Office Action, Office Action Issued in Application No. 2020-564360, Nov. 24, 2021, 7 pages. (Submitted with Machine Translation).
European Patent Office, Office Action Issued in Application No. 19826514.2, Feb. 3, 2022, Germany, 6 pages.
Anonymous: "Fault tolerance—Wikipedia", Jun. 23, 2018, URL:https://en.wikipedia.org/w/index.php?title=Fault_tolerance&oldid=847175524, 8 pages.
Mori Kento et al. "OSS infrastructure environment construction for on-premise business efficiency", IPSJ SIG Technical Report, Sep. 24, 2016, 9 pages.
European Patent Office, Extended European Search Report Issued in Application No. 19826514.2, Apr. 12, 2021, Germany, 9 pages.
ISA State Intellectual Property Office of the People's Republic of China, Written Opinion of the International Searching Authority Issued in Application No. PCT/CN2019/092019, Aug. 26, 2019, WIPO, 10 pages.
Anonymous: "Inter-process communication-Wikipedia", Jun. 13, 2018, pp. 1-5.
Anonymous: "Broadcasting (networking)—Wikipedia", Dec. 12, 2017, pp. 1-3.
European Patent Office, Office Action Issued in Application No. 19826514.2, dated Oct. 10, 2022, 5 pages.
European Patent Office, Office Action Issued in Application No. 19826514.2, Mar. 28, 2023, Germany , 6 pages.

* cited by examiner

SWITCHING BETWEEN MASTER AND STANDBY CONTAINER SYSTEMS

CROSS-REFERENCE TO RELATED APPLICATIONS

The present application is a National Stage of International Application No. PCT/CN2019/092019, filed on Jun. 20, 2019, which claims priority to Chinese patent application No. 2018106971163, entitled "METHOD AND APPARATUS FOR SWITCHING BETWEEN MASTER AND STANDBY CONTAINER SYSTEMS" and filed on Jun. 29, 2018, the disclosure of each of which is incorporated herein by reference in its entirety.

BACKGROUND

In-Service Software Upgrade (ISSU) is a manner by which software on a device can be upgraded with high reliability. Single machine ISSU with dual systems refers to a physical device having two containers, each of which runs one container system respectively, and the two container systems are master container system and standby container system for each other. By applying a virtual technology for isolation, the master container system, the standby container system, and application processes running on the master container system or the standby system can be isolated. The standby container system may switch to function as a master container system when the master container system stops running so that the service upgrade can be ensured.

In a first related art, the master container system and the standby container system may complete switching between the master and standby container systems by sending heartbeats to each other. However, in a case of a large time interval of sending the heartbeats, there may be a problem that the master and standby container systems may not switch in time. In a case of sending heartbeats intensively, more resources of Central Processing Unit (CPU) will be occupied, resulting in a problem of resource wastes.

In a second related art, a third-party system (for example, a physical device, or a physical system) may be run in the physical device to perform master and standby arbitration. The third-party system may monitor the master and standby container systems, and notify the standby container system to switch to function as a master system when the master container system does not run any longer. However, costs of switching between the master and standby container systems are increased by using the third-party system to perform the master and standby arbitration.

BRIEF DESCRIPTION OF THE DRAWINGS

The accompanying drawings, which are incorporated in and constitute a part of this present specification, illustrate illustrative examples, features and aspects of the present disclosure and, together with the description, serve to explain the principles of the present disclosure.

DETAILED DESCRIPTION OF THE EMBODIMENTS

Figure 1:
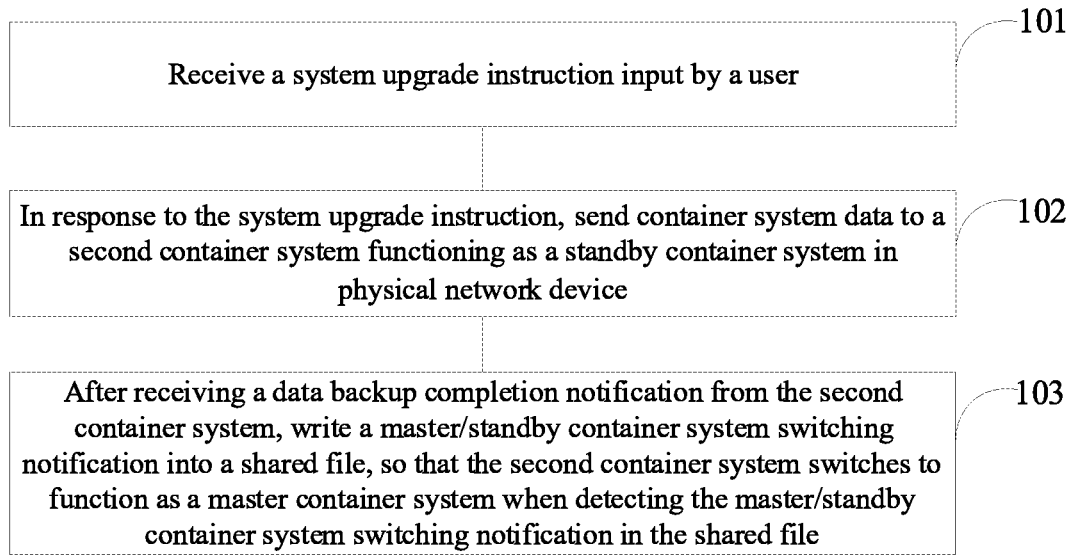
FIG. 1 is a flowchart of a method of switching between master and standby container systems according to an example of the present disclosure.

Various illustrative examples, features and aspects of the present disclosure will be described in detail below with reference to the drawings. Like numerals in the drawings refer to elements with like or similar functions. Although various aspects of the examples are illustrated in the drawings, the drawings are not necessarily drawn pro rata unless otherwise indicated.

The term "illustrative" herein is intended as "serving as an example, an embodiment or exemplary". Any example described as "illustrative" herein is not necessarily interpreted as better than or superior to other examples.

In addition, to better describe the present disclosure, numerous specific details are given in the following specific examples. Those skilled in the art should understand that the present disclosure may be implemented without some specific details. In some instances, methods, approaches, elements and circuits well known to those skilled in the art are not described in detail so as to highlight the gist of the present disclosure.

At present, isolation technology includes virtual machine isolation, process isolation and container isolation.

The virtual machine isolation may completely simulate physical components such as a CPU and a memory in a network device by running a complete operating system and therefore the virtual machine isolation is a heavy-weight virtual technology resulting in slow startup and shutdown and large consumption of hardware resources (such as a memory, a hard disk and a CPU).

The process isolation, as a light isolation, does not perform any physical simulation. In a default case, memories cannot be accessed each other, but network and magnetic disk may be accessed each other. There is no cost to using the process isolation, but the isolation effect is not satisfied.

With coming of containers, a gap between the virtual machine isolation and the process isolation can be filled. The container does not simulate physical devices such as a CPU and a memory, nor have its own kernel. The container usually runs only one group of user mode programs and shares one kernel with a host machine. The container encapsulates a running environment, a cache environment, a database environment and so on required for application to support programs running in a simple manner. One container may be equivalent to a separate and complete software system, for example, a comware software system.

The container technology does not involve hardware and kernel, and only runs required programs, that is, does not include those programs involved in the operating system. Thus, startup is usually very quick. Further, only required programs and dependent libraries may be run and therefore a smaller space may be taken compared with a complete virtual machine.

To solve the problem that the master and standby container systems may not switch in time or switching between the master and standby container systems may easily cause resource wastes in the first related art, and the problem that the cost of switching between the master and standby container systems is high in the second related art, a shared file is created in a physical network device and the standby container system monitors the shared file in examples of the present disclosure. When performing switching between master and standby containers, the master container system may write a master/standby container system switching notification into the shared file. When the standby container system detects the above master/standby container system switching notification in the shared file, the standby container system switches to function as a master container system, so as to ensure timeliness of switching between the master and standby container systems without wasting resources and lower the cost of switching between the master and standby container systems.

Examples of the present disclosure may not only be applied to an environment of single machine ISSU with dual containers, but also be applied to an environment of single machine ISSU with multiple containers (one master container system and multiple standby container systems). In the environment of single machine ISSU, at least two container systems (a master container system and a standby container system) exist in the physical network device and perform switching between the master and standby container systems. The examples of the present disclosure will be described with an application in the environment of single machine ISSU as an example.

FIG. 1 is a flowchart of a method of switching between master and standby container systems according to an example of the present disclosure. The method may be applied to a first container system deployed in a physical network device, and a shared file is created in the physical network device. The first container system functions as a master container system running in the physical network device, and the running environment of the physical network device is single machine ISSU. As shown in FIG. 1, the method of switching between master and standby container systems may include the following blocks.

At block 101, the first container system receives a system upgrade instruction input by a user.

In an example of the present disclosure, the first container system runs in the physical network device. When the first container system needs to be upgraded, the user may input the system upgrade instruction through a command line and so on.

At block 102, in response to the system upgrade instruction, the first container system sends container system data to a second container system which functions as a standby container system in the physical network device.

After receiving the system upgrade instruction, the first container system may copy and compress the container system data of the first container system (for example, various data of application processes) and send the copied and compressed container system data to the second container system in response to the system upgrade instruction. After receiving the above system data, the second container system may back up the above system data and send a data backup completion notification to the first container system after completing the backup operation.

In an example of the present disclosure, in an implementation, the second container system is a container system that is created previously in the physical network device, the second container system runs in a background of the physical network device, and a user has no perception for the second container system. In another implementation, the physical network device currently runs the first container system. After the first container system receives the system upgrade instruction, the physical network device creates the second container system. The first container system establishes communication connection with the second container system and sends the container system data to the created second container system.

At block 103, after receiving a data backup completion notification from the second container system, the first container system writes a master/standby container system switching notification into the shared file, so that the second container system switches to function as the master container system when detecting the master/standby container system switching notification in the shared file.

After receiving the above data backup completion notification, the first container system writes the master/standby container system switching notification into the shared file. After detecting the master/standby container system switching notification in the shared file, the second container system switches to function as the master container system, thereby completing switching between master and standby container systems.

It is noted that the example of the present disclosure may also be applied to an environment of ISSU with multiple container systems (one master container system and multiple standby container systems). In the environment of one master container system and multiple standby container systems, when upgrading, the master container system may designate one standby container system to function as the master container system, or the multiple standby container systems may elect one master container system from the multiple standby container systems by performing an election operation.

For example, the master container system may designate one standby container system in the multiple standby container systems to function as a to-be-switched standby container system and write the master/standby container system switching notification into the shared file, where the master/standby container system switching notification includes identifier information of the to-be-switched standby container system. The multiple standby container systems monitor the shared file. When the master/standby container system switching notification is detected, the standby container system represented by the identifier information of the to-be-switched standby container system included in the master/standby container system switching notification responds to the master/standby container system switching notification and switches to function as the master container system.

For another example, the master container system writes the master/standby container system switching notification into the shared file. The multiple standby container systems monitor the shared file. When detecting the master/standby container system switching notification, the multiple standby container systems perform an election operation.

For example, elect one standby container system keeping alive for long time and/or having a small MAC address to function as the master container system. The elected standby container system switches to function as the master container system in response to the master/standby container system switching notification.

Therefore, according to the method of switching between master and standby container systems provided in the examples of the present disclosure, the first container system sends the container system data to the second container system after receiving the system upgrade instruction input by a user, and writes the master/standby container system switching notification into the shared file after receiving the data backup completion notification from the second container system, so that the second standby container system monitoring the shared file may switch to function as the master container system after detecting the master/standby container system switching notification.

In this way, in the first aspect, the method of switching between master and standby container systems provided in the example of the present disclosure will not affect currently running application processes. In the second aspect, since the second container system monitors the shared file in real time, the second container system may switches to function as the master container system when the first container system writes the master/standby container system switching notification into the shared file, thereby ensuring that the master and standby container systems can switch in real time. Further, in the process of monitoring a change of the shared file by the second container system, when the shared file does not change, CPU resources will not be consumed, and thus the resource waste can be reduced. In the third aspect, since a third-party system is not required for performing master and standby arbitration, the costs of switching between the master and standby container systems can be saved.

In another example, after writing the master/standby container system switching notification into the shared file, the first container system may send a container system exit notification to each application process running in the first container system, so that each application process may stop running in the first container system according to the container system exit notification. In this way, resources occupied by each application process in the first container system will be released. An example of the present disclosure will be described below with reference to a flowchart of a method of switching between master and standby container systems as shown in FIG. 2.

Figure 2:
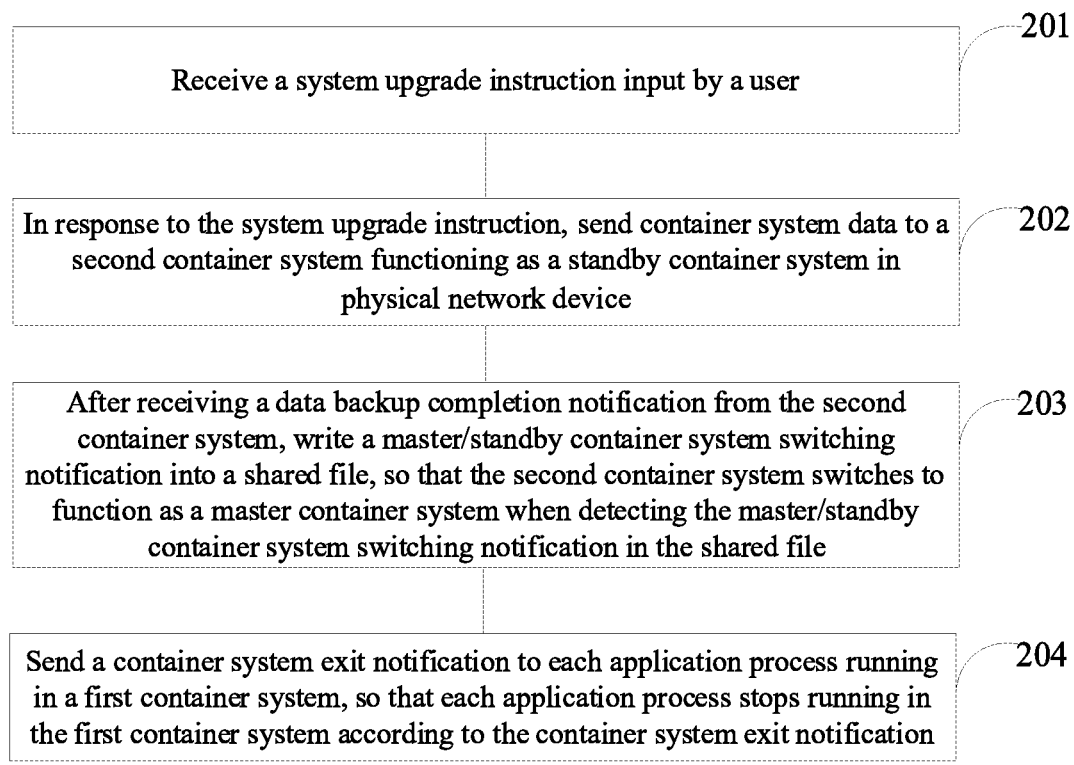
FIG. 2 is a flowchart of a method of switching between master and standby container systems according to another example of the present disclosure.

Specifically, the method of switching between master and standby container systems shown in FIG. 2 includes the following blocks.

At block 201, a first container system receives a system upgrade instruction input by a user.

At block 202, in response to the system upgrade instruction, the first container system sends container system data to a second container system functioning as a standby container system in a physical network device.

At block 203, after receiving a data backup completion notification from the second container system, the first container system writes a master/standby container system switching notification into a shared file, so that the second container system switches to function as the master container system when detecting the master/standby container system switching notification in the shared file.

It is noted that blocks 201-203 in the example of the present disclosure are similar to blocks 101-103 in the foregoing method example, and will not be described again herein.

At block 204, the first container system sends a container system exit notification to each application process running in the first container system, so that each application process stops running in the first container system according to the container system exit notification.

The first container system sends the container system exit notification to each application process running in the first container system, for example, the first container system sends the container system exit notification in a broadcast manner. After receiving the container system exit notification, each application process stops running based on the container system exit notification to release resources occupied by the first container system.

In a possible implementation, the above method may also include the following block.

A network disconnection instruction is sent to a system driver of the first container system so that the system driver no longer sends or receives data.

The system driver may be a mainboard driver of the first container system. The first container system sends the network disconnection instruction to the system driver of the first container system and the network disconnection instruction instructs the system driver to no longer send data and no longer receive data.

In this way, it is possible to avoid a problem that the first container system still synchronizes data with the second container system when an application process in the first container system does not stop running and the second container system is already switched as the master container system.

To make those skilled in the art better understand examples of the present disclosure, the present disclosure will be described below with specific examples.

Figure 3:
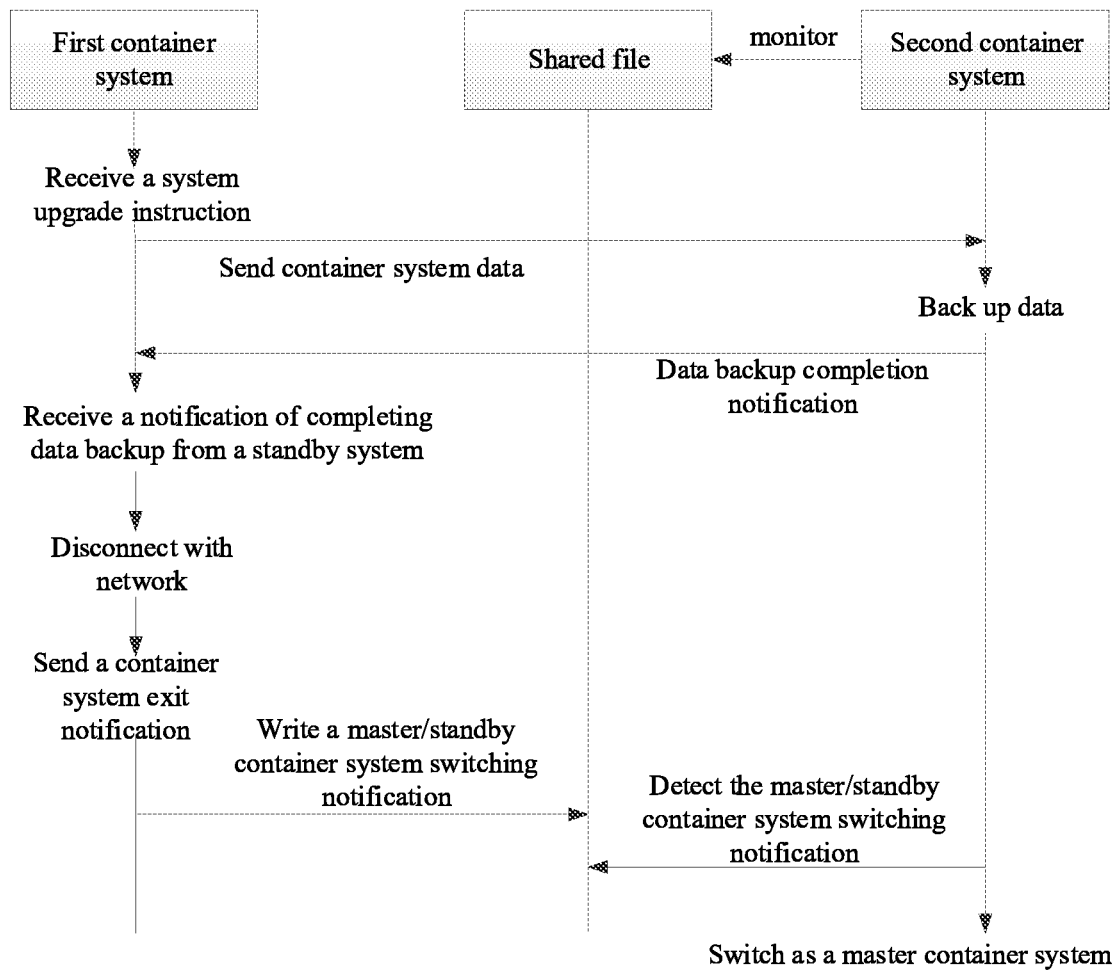
FIG. 3 is a three-party interaction schematic diagram of a method of switching between master and standby container systems according to an example of the present disclosure.

FIG. 3 is a three-party interaction schematic diagram of a method of switching between master and standby container systems according to an example of the present disclosure. As shown in FIG. 3, a physical network device includes a first container system, a second container system and a shared file, where the first container system functions as a master container system, the second container system functions as a standby container system, and the second container system monitors the shared file.

After receiving the system upgrade instruction, the first container system copies and compresses container system data and sends the container system data to the second container system. After receiving the container system data, the second container system backs up the container system data and sends a data backup completion notification to the first container system after completing backup operation for the container system data. After receiving the data backup completion notification, the first container system writes a master/standby container system switching notification into the shared file and sends a network disconnection instruction to a system driver and sends a container system exit notification to each application process.

After detecting the master/standby container system switching notification in the shared file, the second container system switches to function as the master container system.

Figure 4:
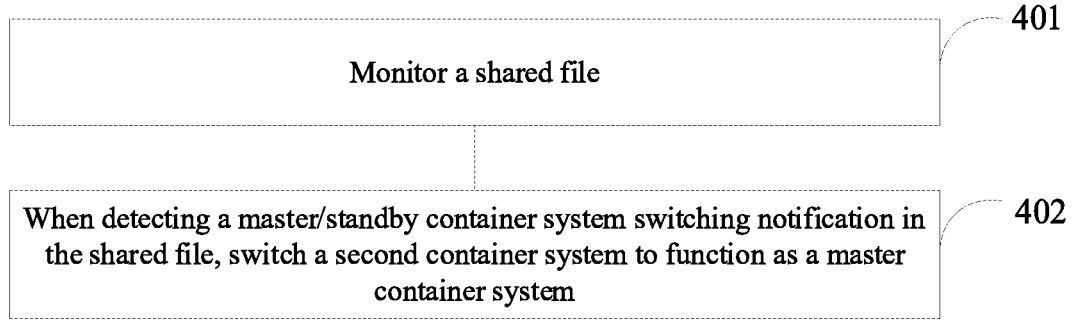
FIG. 4 is a flowchart of a method of switching between master and standby container systems according to still another example of the present disclosure.

FIG. 4 is a flowchart of a method of switching between master and standby container systems according to still another example of the present disclosure. The method may be applied to a second container system deployed in a physical network device, and a shared file is created in the physical network device. The second container system functions as a standby container system running in the physical network device. As shown in FIG. 4, the method of switching between master and standby container systems may include the following blocks.

At block 401, the second container system monitors the shared file.

When starting to run, the second container system starts to monitor the shared file.

At block 402, when detecting a master/standby container system switching notification in the shared file, the second container system switches to function as a master container system.

The master/standby container system switching notification is written into the shared file by a first container system when the first container system functions as a master container system corresponding to the standby container system and determines that the second container system completing data backup.

When performing switching between master and standby container systems, the first container system writes the master/standby container system switching notification into the shared file. When detecting a change of the shared file, such as the master/standby container system switching notification in the shared file, the second container system switches to function as the master container system.

In a possible implementation, the above method also includes: a master-container-system broadcast notification is sent, where the master-container-system broadcast notification comprises address information of the second container system, so that a process receiving the master-container-system broadcast notification sends a data packet to the second container system according to the address information of the second container system.

After switching to function as the master container system, the second container system sends the master-container-system broadcast notification to each application process running in the second container system, where the master-container-system broadcast notification includes the address information of the second container system. When sending a data packet to the master container system, each process receiving the master-container-system broadcast notification may send a data packet to the second container system according to the address information of the second container system.

Thus, according to the method of switching between master and standby container systems provided in the example of the present disclosure, when performing switching between master and standby container systems, the first container system writes the master/standby container system switching notification into the shared file; and after detecting the master/standby container system switching notification in the shared file, the second container system switches to function as the master container system.

In this way, in the first aspect, since the second container system monitors the shared file in real time, the second container system can switch to function as the master container system when the first container system writes the master/standby container system switching notification into the shared file, thereby ensuring that the master and standby container systems can switch in real time. Further, in the process of monitoring a change of the shared file by the second container system, when the shared file does not change, CPU resources will not be consumed, and thus the resource waste can be reduced. In the second aspect, since a third-party system is not required for performing master and standby arbitration, the costs of switching between the master and standby container systems can be saved.

In another example, when the second container system functions as the standby container system, the second container system receives container system data from the first container system and backs up the container system data, so that the second container system runs the same application processes as application processes running in the first container system, and sends a data backup completion notification to the first container system after completing the data backup. The present disclosure will be described below by referring to a flowchart of a method of switching between master and standby container systems as shown in FIG. 5.

Figure 5:
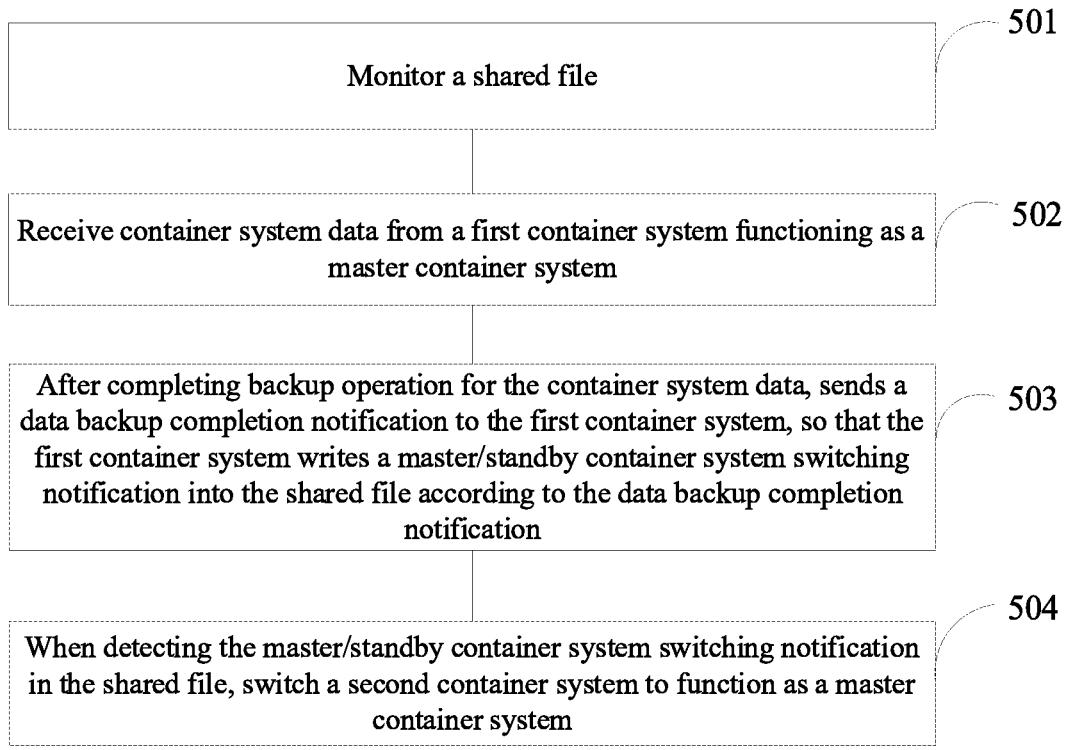
FIG. 5 is a flowchart of a method of switching between master and standby container systems according to yet another example of the present disclosure.

Specifically, the method of switching between master and standby container systems shown in FIG. 5 may include the following blocks.

At block 501, a second container system monitors a shared file.

In the example of the present disclosure, block 501 is similar to block 401 in the foregoing method example, and will not be described again herein.

At block 502, the second container system receives container system data from a first container system functioning as a master container system.

After receiving a system upgrade instruction input by a user, the first container system copies and compresses the container system data and sends the container system data to the second container system.

At block 503, after completing backup operation for the container system data, the second container system sends a data backup completion notification to the first container system, so that the first container system writes a master/standby container system switching notification into the shared file according to the data backup completion notification.

After receiving the container system data, the second container system backs up the container system data and sends the data backup completion notification to the first container system after completing backup operation for the container system data, so that the first container system writes the master/standby container system switching notification into the shared file after receiving the data backup completion notification.

At block 504, when detecting the master/standby container system switching notification in the shared file, the second container system switches to function as the master container system.

The master/standby container system switching notification is written by the first container system into the shared file. In the example, block 504 is similar to block 402 in the foregoing method example, and will not be described again herein.

In this way, according to the method of switching between master and standby container systems provided in the present disclosure, it can be ensured that application processes running in the second container system are same as application processes running in the first container system, and it can be ensured that the application processes currently running will not be affected during a process of master and standby container system switchover.

Figure 6:
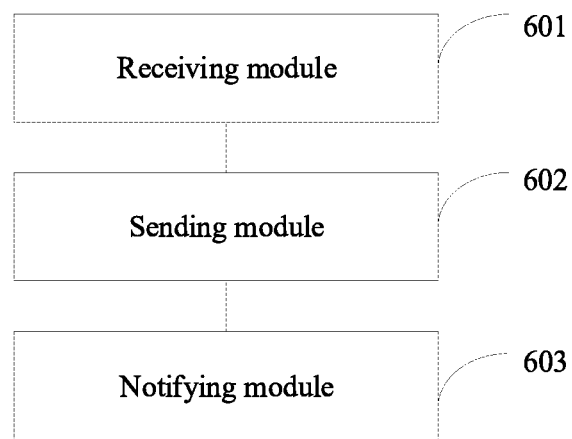
FIG. 6 is a structural block diagram of an apparatus for switching between master and standby container systems according to an example of the present disclosure.

FIG. 6 is a structural block diagram of an apparatus for switching between master and standby container systems according to an example of the present disclosure. The apparatus may be applied to a first container system deployed in a physical network device, and a shared file is created in the physical network device. The first container system functions as a master container system running in the physical network device. As shown in FIG. 6, the apparatus for switching between master and standby container systems may include the following modules.

A receiving module 601, configured to receive a system upgrade instruction input by a user.

A sending module, configured to send container system data to a second container system functioning as a standby container system in the physical network device in response to the system upgrade instruction.

A notifying module 603, configured to write a master/standby container system switching notification into the shared file after receiving a data backup completion notification from the second container system, so that the second container system switches to function as the master container system when detecting the master/standby container system switching notification in the shared file.

Thus, with the apparatus for switching between master and standby container systems provided in the example of the present disclosure, the first container system sends the container system data to the second container system after receiving the system upgrade instruction input by the user, and writes the master/standby container system switching notification into the shared file after receiving the data backup completion notification from the second container system, so that the second container system monitoring the shared file switches to function as the master container system after detecting the master/standby container system switching notification in the shared file.

In this way, in the first aspect, the apparatus for switching between master and standby container systems provided in the example of the present disclosure will not affect currently running application processes. In the second aspect, since the second container system monitors the shared file in real time, the second container system may switches to function as the master container system when the first container system writes the master/standby container system switching notification into the shared file, thereby ensuring that the master and standby container systems can switch in real time. Further, in the process of monitoring a change of the shared file by the second container system, when the shared file does not change, CPU resources will not be consumed, and thus the resource waste can be reduced. In the third aspect, since a third-party system is not required for performing master and standby arbitration, the costs of switching between the master and standby container systems can be saved.

Figure 7:
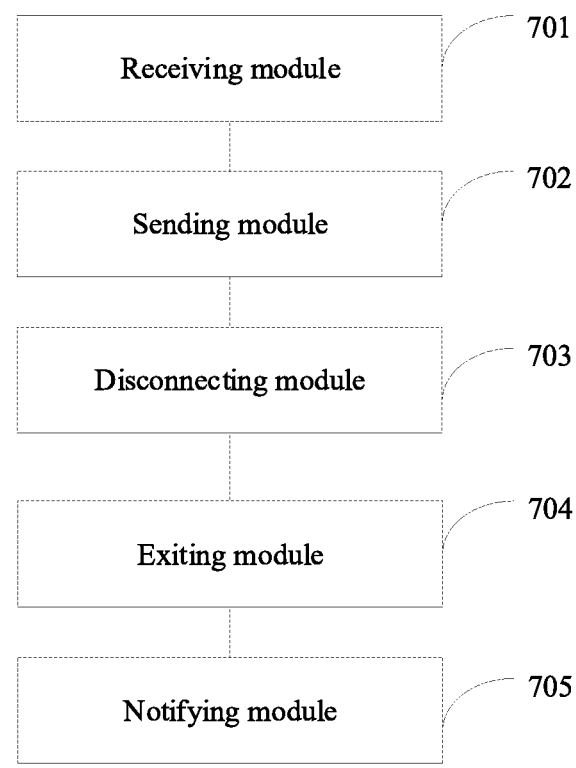
FIG. 7 is a structural block diagram of an apparatus for switching between master and standby container systems according to another example of the present disclosure.

FIG. 7 is a structural block diagram of an apparatus for switching between master and standby container systems according to another example of the present disclosure. A receiving module 701, a sending module 702 and a notifying module 705 are similar to the receiving module 601, the sending module 602 and the notifying module 603 as described in the above example and will not be repeated herein.

In a possible implementation, as shown in FIG. 7, the apparatus also includes:

An exiting module 704, configured to send a container system exit notification to each application process running in the first container system in response to completing writing the master/standby container system switching notification, so that each application process stops running in the first container system according to the container system exit notification.

In a possible implementation, as shown in FIG. 7, the apparatus also includes:

a disconnecting module 703, configured to send a network disconnection instruction to a system driver of the first container system after receiving the data backup completion notification from the second container system, so that the system driver no longer sends and receives data.

Figure 8:
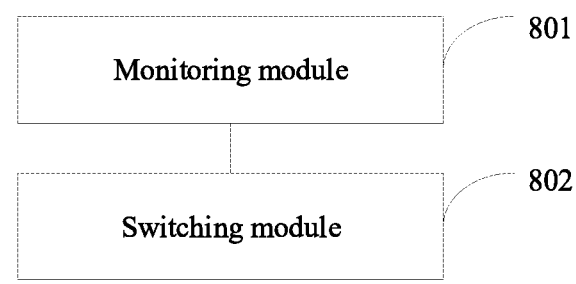
FIG. 8 is a structural block diagram of an apparatus for switching between master and standby container systems according to still another example of the present disclosure.

FIG. 8 is a structural block diagram of an apparatus for switching between master and standby container systems according to still another example of the present disclosure. The apparatus may be applied to a second container system deployed in a physical network device, and a shared file is created in the physical network device. The second container system functions as a standby container system running in the physical network device. As shown in FIG. 8, the above apparatus for switching between master and standby container systems includes the following modules.

A monitoring module 801, configured to monitor the shared file.

A switching module 802, configured to switch the second container system to function as a master container system when detecting a master/standby container system switching notification in the shared file.

The master/standby container system switching notification is written into the shared file by a first container system when the first container system functions as the master container system corresponding to the standby container system and determines that the second container system completes data backup.

Thus, with the apparatus for switching between master and standby container systems provided in the example of the present disclosure, the first container system writes the master/standby container system switching notification into the shared file when performing switching between master and standby container systems, and the second container system switches to function as the master container system after detecting the master/standby container system switching notification in the shared file.

In this way, in the first aspect, since the second container system monitors the shared file in real time, the second container system switches to function as the master container system when the first container system writes the master/standby container system switching notification into the shared file, thereby ensuring that the master and standby container systems switches in real time. Further, in the process of monitoring a change of the shared file by the second container system, when the shared file does not change, CPU resources will not be consumed, and thus the resource waste can be reduced. In the second aspect, since a third-party system is not required for performing master and standby arbitration, the costs of switching between the master and standby container systems can be saved.

Figure 9:
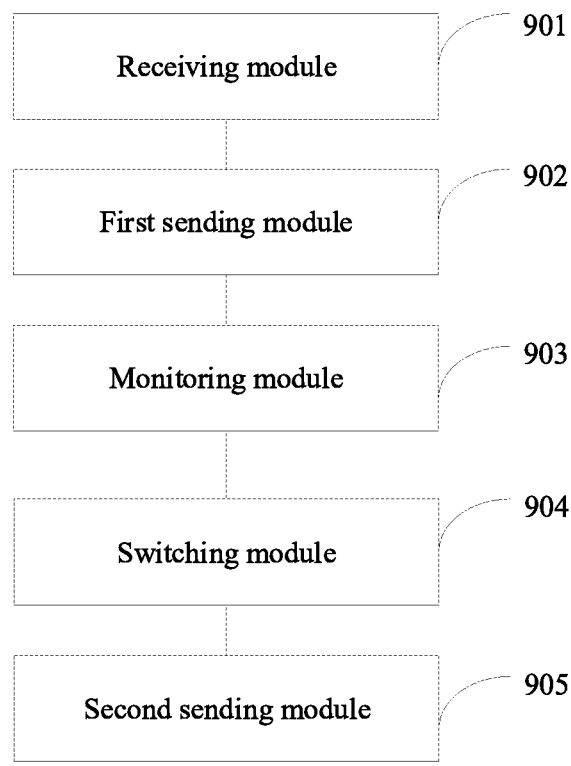
FIG. 9 is a structural block diagram of an apparatus for switching between master and standby container systems according to yet another example of the present disclosure.

FIG. 9 is a structural block diagram of an apparatus for switching between master and standby container systems according to yet another example of the present disclosure. A monitoring module 903 and a switching module 904 are similar to the monitoring module 801 and the switching module 802 as described in the above example and will not be repeated herein.

In a possible implementation, as shown in FIG. 9, the apparatus may also include:

a receiving module 901, configured to receive container system data from the first container system; and a first sending module 902, configured to send a data backup completion notification to the first container system after completing backup operation for the container system data, so that the first container system writes the master/standby container system switching notification into the shared file according to the data backup completion notification.

In a possible implementation, as shown in FIG. 9, the apparatus may also include:

a second sending module 905, configured to send a master-container-system broadcast notification, where the master-container-system broadcast notification comprises address information of the second container system, so that a process receiving the master-container-system broadcast notification sends a data packet to the second container system according to the address information of the second container system.

Figure 10:
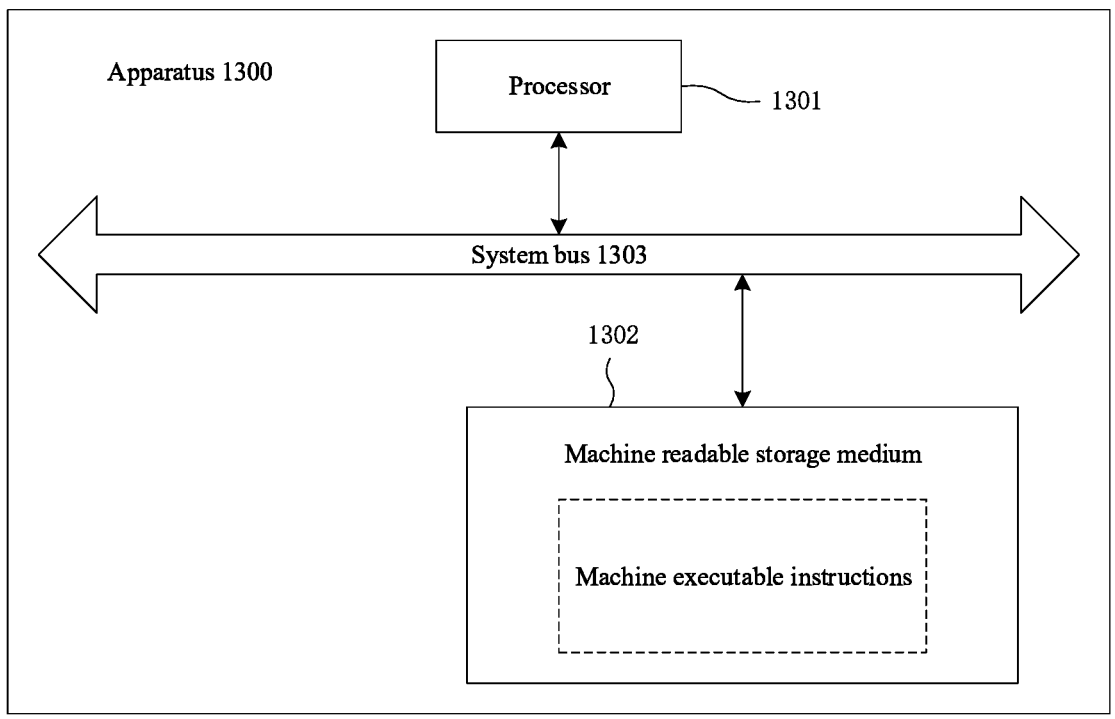
FIG. 10 is a hardware structural block diagram of an apparatus for switching between master and standby container systems according to an example of the present disclosure.

FIG. 10 is a hardware structural block diagram of an apparatus for switching between master and standby container systems according to an example of the present disclosure. In a practical application, the apparatus may be implemented through a network device. As shown in FIG. 10, the apparatus 1300 may include a processor 1301 and a machine readable storage medium 1302 storing machine executable instructions. The processor 1301 and the machine readable storage medium 1302 may communicate via a system bus 1303. Also, by reading the machine executable instructions stored in the machine readable storage medium 1302 and corresponding to the logic of switching between master and standby container systems, the processor 1301 is caused to perform the above methods of switching between master and standby container systems.

The machine readable storage medium 1302 mentioned herein may be any of electronic, magnetic, optical or other physical storage devices and may contain or store information such as executable instructions, data, and so on. For example, the machine readable storage medium may be a Radom Access Memory (RAM), a volatile memory, a non-volatile memory, a flash memory, a storage drive (e.g. hard disk drive), a solid state hard disk, any type of storage disk (e.g., compact disk, Digital Video Disk (DVD)), or a similar storage medium, or a combination thereof.

The examples of the present disclosure described as above are illustrative and non-exhaustive, and are not limited to these examples disclosed herein. It is apparent that many changes and modifications may be made by those skilled in the art without departing from the scope and spirit of the examples of the present disclosure. The selection of terms used herein is intended to best explain the principle and the practical applications of different examples or technical improvements of technologies in market, or to allow other persons skilled in the art to understand the examples of the present disclosure.

The invention claimed is:

1. A method of switching between master and standby container systems, the method being applied to a first container system deployed in a physical network device and functioning as a master container system, a shared file being created in the physical network device, and the method comprising:

receiving a system upgrade instruction input by a user;

in response to the system upgrade instruction, sending container system data to a second container system functioning as a standby container system corresponding to the master container system in the physical network device; and upon receiving a data backup completion notification from the second container system, sending a network disconnection instruction to a system driver of the first container system, so that the system driver no longer sends and receives data via a network while retaining write access to the shared file, and writing a master/standby container system switching notification into the shared file, and wherein multiple standby container systems monitor the shared file, and upon detecting a presence of the master/standby container system switching notification in the shared file monitored by the multiple standby container systems, the multiple standby container systems perform an election operation to select one of the standby container systems to function as a new master container.

2. The method according to claim 1, further comprising in response to completing writing the master/standby container system switching notification, sending a container system exit notification to each application process running in the first container system, so that each application process stops running in the first container system according to the container system exit notification.

3. A method of switching between master and standby container systems, the method being applied to a second container system deployed in a physical network device and functioning as a standby container system, a shared file being created in the physical network device, and the method comprising:

monitoring the shared file, wherein multiple standby container systems are monitoring the shared file, and upon detecting a presence of a master/standby container system switching notification in the shared file being monitored by the multiple standby container systems, the multiple standby container systems perform an election operation to select the second container system to function as a new master container; and switching the second container system to function as a master container system;

wherein, the master/standby container system switching notification is written into the shared file by a first container system when the first container system functions as the master container system corresponding to the standby container system and determines that the second container system completes data backup, after switching the second container system to function as a master container system, the first container disconnects from a network while retaining write access to the shared file.

4. The method according to claim 3, further comprising:

receiving container system data from the first container system; and upon completing backup operation for the container system data, sending a data backup completion notification to the first container system, so that the first container system writes the master/standby container system switching notification into the shared file according to the data backup completion notification.

5. The method according to claim 3, further comprising:

sending a master-container-system broadcast notification, wherein the master-container-system broadcast notification comprises address information of the second container system, so that a process receiving the master-container-system broadcast notification sends a data packet to the second container system according to the address information of the second container system.

6. A network device, comprising a first container system, multiple second container systems and a shared file, wherein the first container system functions as a master container system, and the second container systems function as multiple standby container systems;

the first container system comprises at least one processor and at least one memory, the at least one memory storing computer program code, wherein the at least one memory and the computer program code are configured, with the at least one processor, to: receive a system upgrade instruction input by a user; in response to the system upgrade instruction, send container system data to the second container systems; and upon receiving a data backup completion notification from the second container systems, send a network disconnection instruction to a system driver of the first container system, so that the system driver no longer sends and receives data via a network while retaining write access to the shared file, and write a master/standby container system switching notification into the shared file; and the second container systems comprise at least one processor and at least one memory, the at least one memory storing computer program code, wherein the at least one memory and the computer program code are configured, with the at least one processor, to: monitor the shared file, and upon detecting a presence of the master/standby container system switching notification in the shared file being monitored by the second container systems, perform an election operation to select one of the standby container systems to function as a new master container.

7. The network device according to claim 6, wherein the first container system is further configured to:

in response to completing of the writing of the master/standby container system switching notification, send a container system exit notification to each application process running in the first container system, so that each application process stops running in the first container system according to the container system exit notification.

8. The network device according to claim 6, wherein the second container system is further configured to:

receive the container system data from the first container system; and upon completing backup operation for the container system data, send the data backup completion notification to the first container system.

9. The network device according to claim 6, wherein the second container system is further configured to:

sends a master-container-system broadcast notification including address information of the second container system, so that a process receiving the master-container-system broadcast notification sends a data packet to the second container system according to the address information of the second container system.

10. A non-transitory storage medium storing instructions that are executable by at least one processor to perform the method of switching between master and standby container systems according to claim 1.

11. A non-transitory storage medium storing instructions that are executable by at least one processor to perform the method of switching between master and standby container systems according to claim 3.

* * * * *